(12) United States Patent
O'Sullivan

(10) Patent No.: US 7,217,066 B2
(45) Date of Patent: May 15, 2007

(54) SYSTEM FOR STABILIZING GRAVITY-BASED OFFSHORE STRUCTURES

(75) Inventor: James O'Sullivan, Houston, TX (US)

(73) Assignee: Technip France, Courbevoie (FR)

( * ) Notice: Subject to any disclaimer, the term of this patent is extended or adjusted under 35 U.S.C. 154(b) by 0 days.

(21) Appl. No.: 11/053,378

(22) Filed: Feb. 8, 2005

(65) Prior Publication Data
US 2006/0177274 A1  Aug. 10, 2006

(51) Int. Cl.
*E02B 17/00* (2006.01)
*E02D 5/74* (2006.01)

(52) U.S. Cl. ..................................... 405/224
(58) Field of Classification Search ................ 405/203, 405/204, 224, 205, 207, 208, 223.1
See application file for complete search history.

(56) References Cited

U.S. PATENT DOCUMENTS

| 4,106,301 A | * | 8/1978 | Gerwick, Jr. ............... 405/224 |
| 4,265,568 A |  | 5/1981 | Herrmann et al. .......... 405/196 |
| 5,004,272 A | * | 4/1991 | Kipp ............................ 285/24 |
| 5,186,582 A |  | 2/1993 | Bullivant ..................... 405/239 |
| 5,558,467 A |  | 9/1996 | Horton ........................ 405/195 |

FOREIGN PATENT DOCUMENTS

GB     2 225 365     5/1990

* cited by examiner

*Primary Examiner*—Sunil Singh
(74) *Attorney, Agent, or Firm*—Klein, O'Neill & Singh, LLP; Howard J. Klein

(57) ABSTRACT

A system for stabilizing gravity-based offshore structure anchored in a seabed includes a plurality of upper locking element sets installed in a keel on the bottom of the structure; a plurality of caissons embedded in the seabed; a plurality of inserts, each of which is removably installed in one of the caissons; and a lower locking element set in each of the inserts. Each of the lower locking element sets is lockably engageable with one of the upper locking element sets when the keel is set down on top of the caissons. The inserts are permanently attachable to the keel by a grouting material that may be pumped into the inserts through the keel. The arrangement stabilizes the structure against lateral shear forces, while allowing the structure to be easily removed from the caissons, with the inserts attached to the keel, by the application of a vertical lifting force. The structure may then be moved and installed on a second plurality of caissons embedded at second seabed site.

22 Claims, 4 Drawing Sheets

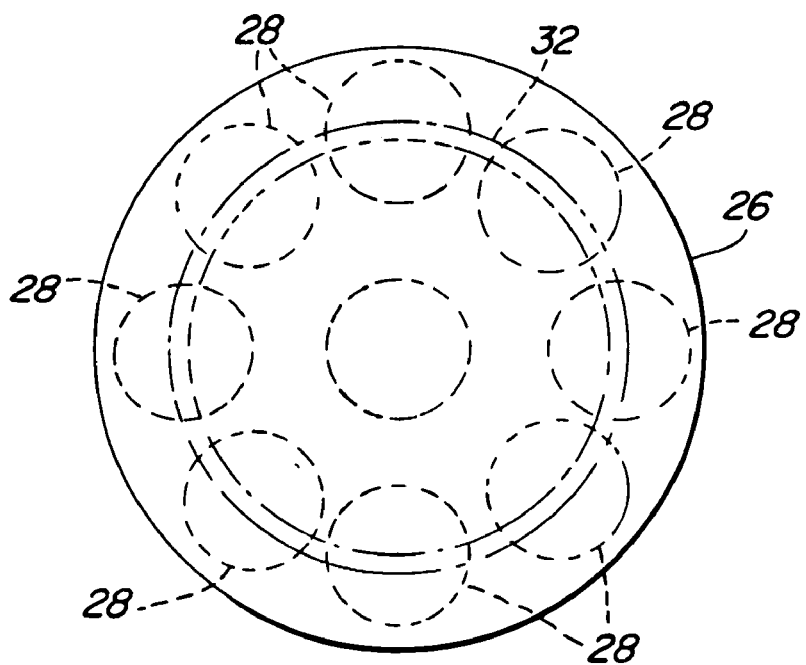
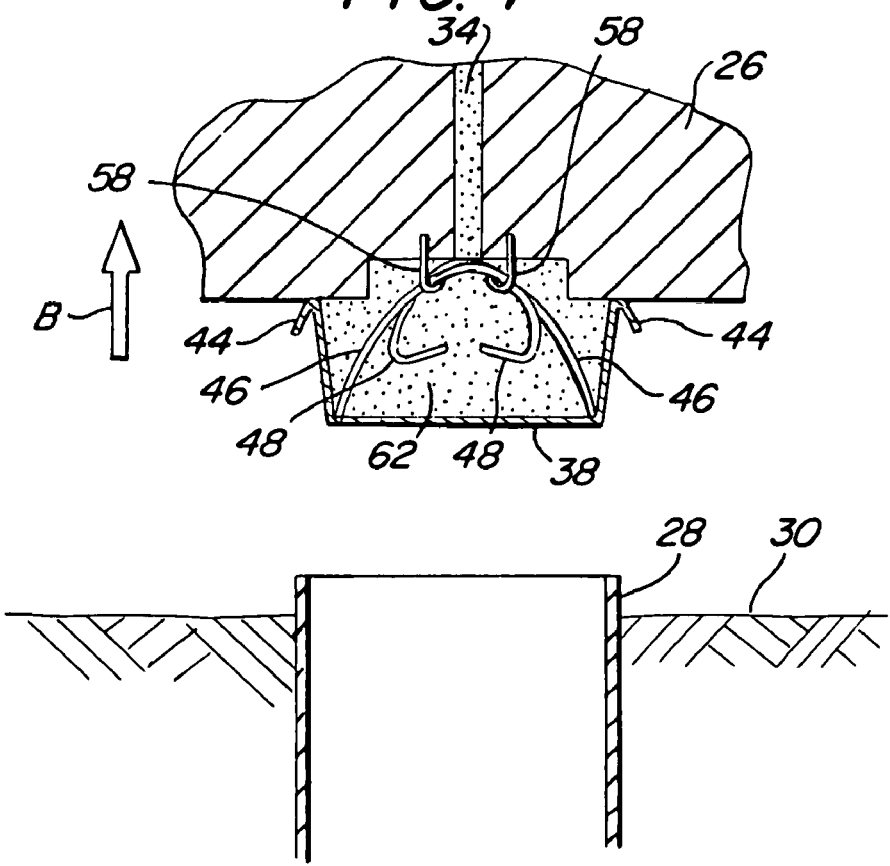

SYSTEM FOR STABILIZING GRAVITY-BASED OFFSHORE STRUCTURES

CROSS-REFERENCE TO RELATED APPLICATIONS

Not Applicable

FEDERALLY-SPONSORED RESEARCH OR DEVELOPMENT

Not Applicable

BACKGROUND OF THE INVENTION

The present invention relates generally to the field of offshore structures for the exploration and production of mineral resources (e.g., petroleum and natural gas) from the seabed. More particularly, the present invention relates to the type of structure commonly referred to as a "gravity-based structure" or "GBS," and specifically it relates to a system for stabilizing such structures against lateral shear forces, for example, of the type exerted by strong wave action during storms.

Gravity-based structures, as exemplified in U.S. Pat. No. 4,265,568, are suitable for use in relatively shallow bodies of water, where it is practical to anchor the bottom (keel) of the GBS to caissons embedded in the seabed. In such shallow water applications, the GBS is sometimes subjected to very strong lateral shear forces exerted by wave action during storms. To stabilize the GBS against such shear forces, shear skirts are provided around the keel. In some installations (e.g., in areas of unconsolidated clay seabed), the shear skirts may have a height of about 10 meters or more, requiring a deep graving dock for fabrication and float-out of the GBS. Thus, the need for tall shear skirts increases the costs of fabricating and installing the GBS.

It would thus be advantageous to provide a mechanism for stabilizing a GBS against lateral shear forces that does not require the use of shear skirts.

SUMMARY OF THE INVENTION

Broadly, the present invention is a system for stabilizing a gravity-based offshore structure (GBS) against lateral shear forces, comprising a plurality of upper locking element sets installed in a keel fixed to the bottom of the structure, each of the upper locking element sets being lockably engageable with a corresponding one of a plurality of lower locking element sets, each of which is installed in one of a plurality of caissons embedded in the seabed, the caissons being located so that each upper locking element set registers with a corresponding lower locking element set. In a preferred embodiment, the upper locking element sets are fixed at spaced intervals in the bottom surface of the keel, and each of the corresponding lower locking element sets is fixed in an insert that is securely, but removably, installed in a caisson.

More specifically, in a preferred embodiment, the upper locking element sets are located in a circumferential recess or groove in the bottom surface of the keel. The recess or groove communicates with one or more grout channels through which a grouting material (e.g., concrete) can be pumped. Each of the lower locking element sets is fixed in an insert that removably fits into an open top of one of the caissons. When the keel is lowered onto the caissons, the locking elements in the upper locking element sets engage with the locking elements in the lower locking element sets. The grouting material is pumped into the recess or groove, filling the recess or groove and the interior of the inserts, and thereby forming a shear cleat in each insert, in which the upper and lower locking element sets are permanently cemented together. The shear cleats, with the interlocking upper and lower locking elements encased in concrete, provide excellent resistance to lateral shear forces. The GBS can be readily removed from the caissons, however, simply by applying a vertical force to lift the inserts, still attached to the keel, out of the caissons.

In the preferred embodiment described herein, each of the upper locking element sets comprises a plurality of upper locking elements formed from bent metal rods, such as "rebar," each of which extends generally downwardly and terminates in a radially inward hooked end. Likewise, each of the lower locking element sets comprises a plurality of lower locking elements formed from similar bent metal rods, such as "rebar." Each of the lower locking elements extends generally upwardly above the top of its respective insert and preferably terminates in a hooked end. When the keel is lowered onto the caissons and the inserts containing the lower locking element sets, the lower locking elements are bent downward and radially inward and into engagement with the upper locking elements.

In another aspect, the present invention is a method of installing and anchoring a gravity-based structure (GBS) in the seabed, comprising the steps of (a) installing a plurality of caissons in the seabed, each of the caissons having an open upper end; (b) installing an insert in the open end of each caisson, each of the inserts having a lower locking element set in its interior; (c) providing a GBS having a keel in which is installed a plurality of upper locking element sets, each of the upper locking element sets being registrable with a corresponding one of the lower locking element sets; (d) setting the keel of the GBS down on top of the caissons so that each of the upper locking element sets registers and engages with a corresponding one of the lower locking element sets; and (e) filling the inserts with a grouting material so as to permanently fix the keel to the inserts. In a specific preferred embodiment of the invention, as noted above, the upper locking element sets are located in a circumferential recess or groove in the bottom surface of the keel, and the recess or groove communicates with one or more grouting channels through which the grouting material is pumped in performing the filling step. Also, in the specific preferred embodiment described herein, the inserts are removably installed in the caissons, so that the GBS can be removed from its seabed installation by applying a vertical lifting force to the GBS so as to lift the inserts out of the caissons, the inserts remaining attached to the keel. Thus, the GBS can be moved to another (second) site at which a second plurality of caissons has been installed, and then lowered until the inserts are received in the caissons at the second site.

The present invention provides a GBS installation that offers excellent resistance to lateral shear forces, without the need for expensive and difficult-to-install shear skirts. Moreover, the present invention provides a GBS anchoring system that allows a GBS to be easily relocated from one seabed site to another. These and other advantages of the invention will be more readily understood and appreciated from the detailed description that follows.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIG. 6 is a cross-sectional view taken along line 6—6 of FIG. 1, showing the keel of the GBS and the arrangement of the caissons (in phantom) relative to the keel, according to a preferred embodiment of the present invention;

FIG. 7 is a cross-sectional view, similar to that of FIG. 5, showing the step of removing the GBS with the attached insert from the caisson.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, as embodied in one or more preferred embodiments.

Broadly, the present invention generally provides a system and method for installing and anchoring a gravity-based structure in a seabed. The system for stabilizing a gravity-based structure produced according to the present invention may find beneficial use in many industries including offshore petroleum drilling and production. Although the following discussion may use an offshore platform as an exemplary demonstration, it is to be understood that this discussion is not limiting and that the present invention may be used in other suitable applications that may utilize a gravity-based offshore structure.

Figure 1:
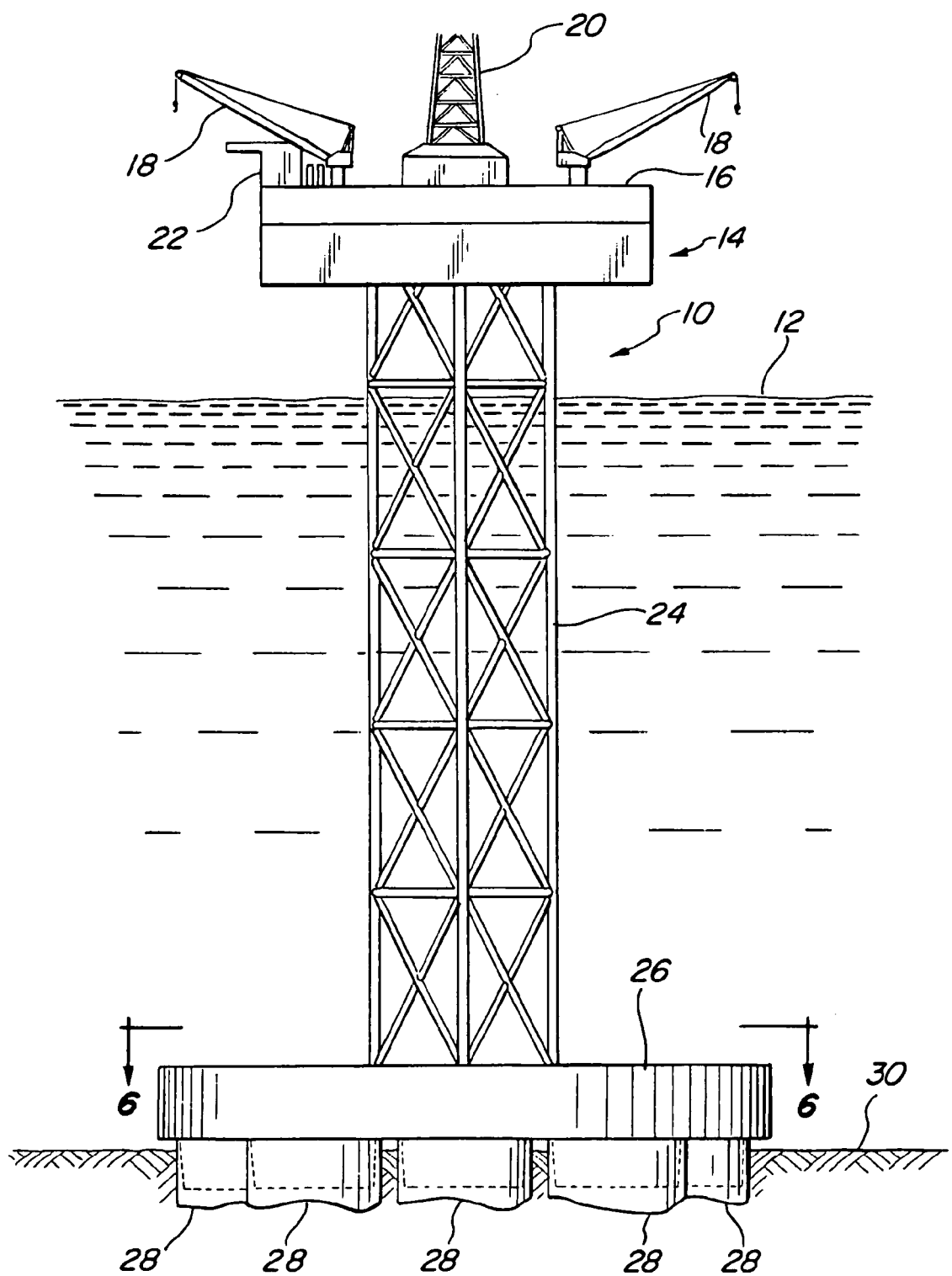
FIG. 1 is a simplified and idealized elevational view of a gravity-based structure (GBS) incorporating the present invention.
Figure 2:
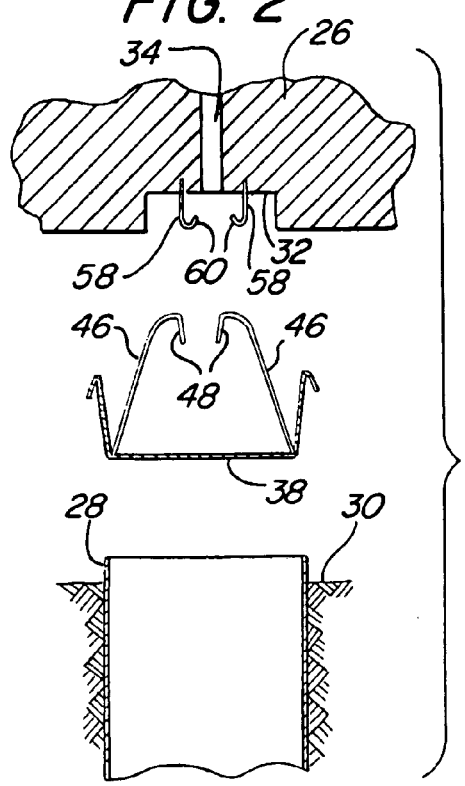
FIG. 2 is an exploded, cross-sectional view of the major components of a preferred embodiment of the present invention.

FIG. 1 shows an elevational view of a gravity-based offshore structure (GBS) 10 which employs the stabilizing system of the present invention to stabilize the GBS 10 against lateral shear forces produced by waves and currents within a body of water 12, such as an ocean. The GBS 10 generally may comprise a platform 14 having a deck 16 on which may be situated one or more cranes 18, a derrick 20, and a crew quarters 22. A supporting structure or leg 24 (such as a truss column, as shown, for example) has an upper end that supports the platform 14 above the surface of the body of water 12, and a lower end that is fixed to a gravity base or keel 26 that rests on a plurality of caissons 28 that are anchored in the seabed 30, and that form a part of the stabilizing system of the present invention, as described below.

The gravity base or keel 26 may be formed as monolithic hull structure that is internally divided into floodable compartments (not shown) by internal bulkheads (not shown). The compartments include conventional ballasting mechanisms (not shown) to fill the keel with ballast (such as seawater) to sink the keel to the seabed for supporting the platform 14 above the water surface. An exemplary gravity base or keel structure is described in the above-referenced U.S. Pat. No. 4,265,568, the disclosure of which is incorporated herein by reference.

FIG. 6 shows the keel 26, which may be any arbitrary shape, although a generally circular shape is shown. The bottom surface of the keel rests on a plurality of caissons 28 that are anchored in the seabed in a pattern that advantageously roughly corresponds to the periphery of the keel 26. The bottom surface of the keel 26 includes a grout ring 32 (the purpose of which will be explained below) in the form of a circumferential recess or groove that generally has the same configuration as the periphery of the keel 26. Thus, in the illustrated embodiment, in which the keel 26 is circular, the grout ring 32 is substantially annular. The grout ring 32 is located and configured so that, when the keel 26 is seated on the caissons 28 (as will be described below), the grout ring 32 traverses the open upper end of each of the caissons 28. As shown in FIGS. 2–5 and 7, the keel 26 includes a plurality of grout channels 34 (only one of which is shown) that communicate with the grout ring 32, for purposes to be described below.

FIGS. 2–5 show the components of the stabilizing system according to a preferred embodiment of the present invention, in conjunction with a single caisson 28. It is understood that the system of the present invention employs like components in conjunction with each of the caissons 28 on which the GBS 10 rests, as shown in FIGS. 1 and 6.

The stabilization system of the present invention comprises the plurality of caissons 28 shown in FIGS. 1 and 6, each of which is anchored in the seabed 30. Each of the caissons 28 is in the form of a hollow, tubular element, which may be formed of a suitable steel alloy, and which has an open upper end. The stabilization system further comprises a plurality of cup-like inserts 38, each of which fits into the open upper end of one of the caissons 28. The inserts 38 may likewise be made from a suitable steel alloy, and they may advantageously have a peripheral flange 44 that seats around the peripheral rim at the open upper end of the caisson 28, as shown, e.g., in FIG. 3.

A plurality of lower locking element sets (only one of which is shown) is provided, each of which extends upwardly from the bottom of each of the inserts 38. Each lower locking element set comprises two or more lower locking elements 46 formed from metal rods that extend upwardly and radially inwardly from the bottom of the insert 38, and that terminate in a free end 48 that may advantageously be bent downwardly and radially inwardly in a hook-shaped configuration. Tile lower locking elements 46 may conveniently be formed of suitably bent lengths of conventional rebar that are welded to interior bottom surface of the inserts 38, and they are long enough to extend upwardly beyond the peripheral flange 44 of the insert 38.

A plurality of upper locking element sets (only one of which is shown in the drawings) is installed in the grout ring 32 in the bottom surface of the keel 26. Each of the upper locking element sets comprises two or more upper locking elements 58 formed from metal rods that extend generally downwardly, and that terminate in an end formed as an upper hook 60 that is preferably bent radially inwardly and upwardly, as shown in the drawings. Alternatively, the upper hook may be bent radially outwardly. The upper locking elements 58 may be formed of suitable lengths of rebar that are fixed to the keel 26 in the grout ring 32. The upper locking elements 58 in each upper locking element set are advantageously spaced around the opening of one of the grout channels 34 into the grout ring 32.

Figure 3:
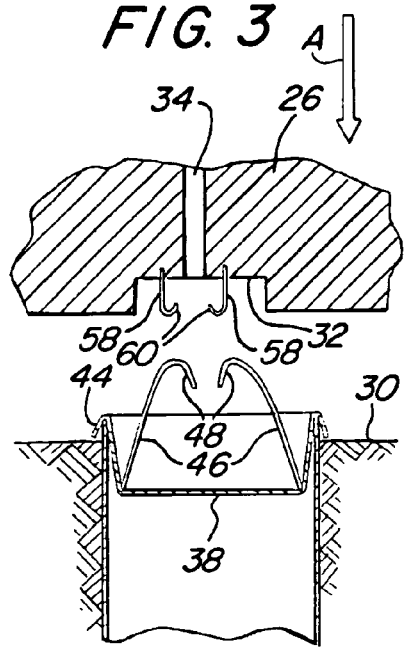
FIG. 3 is cross-sectional view, similar to that of FIG. 2, showing the step of setting the keel of the GBS down on top of a caisson in which the insert of the invention has been installed.

FIG. 3 shows the step of installing the inserts 38 into the open upper ends of the caissons 28. The inserts 38 may be installed such that their flanges 44 may seat against the upper peripheral rims of the caissons 28. The keel 26 may then be lowered in a generally vertical direction, as indicated by the arrow A, for engagement between the lower locking elements 46 and the upper locking elements 58. The lower locking elements 46 in each lower locking element set may be lockably engageable with the upper locking elements 58 in each corresponding upper locking element set, such that each lower locking element 46 may register and interconnect with a corresponding upper locking element 58 to secure the keel 26 to the insert 38, as shown in FIG. 4.

Figure 4:
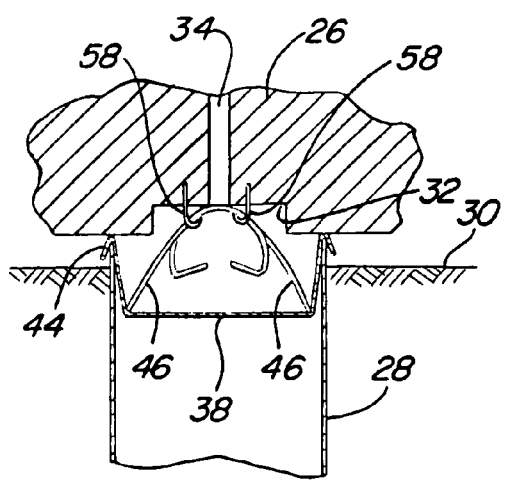
FIG. 4 is a cross-sectional view, similar to that of FIG. 3, showing the keel having been set down on top of the caisson, but before the step of pumping the grouting material into the insert.

FIG. 4 shows the lower locking element set and the upper locking element set engaged and locked together after the keel 26 has been set down on top of the caissons 28. The weight of the keel 26 bends the lower locking elements 46 down into the interior of the inserts 38 and toward each other, as shown in FIG. 4, forming a web in the interior of each insert 38. The upper hooks 60 may serve to grapple the lower locking elements 46 to secure the keel 26 in place on the seabed 30, or at least be situated to restrain the keel 26 from excess lateral movement in response to underwater shear forces. The lower locking elements 46 may be disposed at acute angles with respect to the inserts 38 to facilitate transfer of lateral shear forces from the offshore structure 10 to the caissons 28. Furthermore, as shown in FIG. 4, the bottom keel surface rests on top of the inserts 38 to seal the insert 38 from the surroundings. If the weight of the keel 26 is sufficient, the peripheral flanges 44 of the inserts 38 may flatten, so that the keel rests directly on the seabed 30, rather than just above it, as shown in the drawings.

Figure 5:
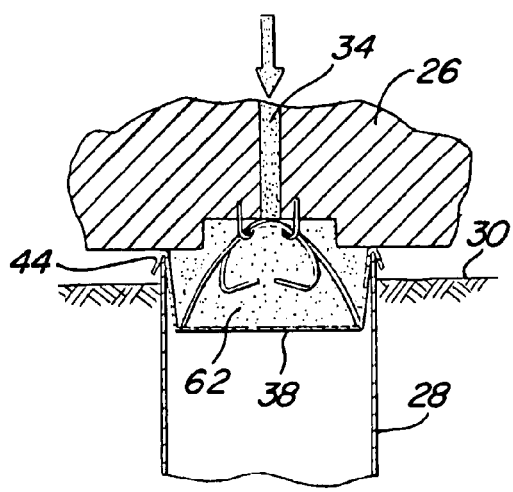
FIG. 5 is a cross-sectional view, similar to that of FIG. 4, but showing the step of pumping the grouting material into the insert.

FIG. 5 shows the subsequent step of introducing a grouting material 62 (such as cement or concrete) into the inserts 38 to form each of the inserts 38 into a shear cleat structure. The grouting material 62 may be introduced into the insert 38 via the grout channels 34, for example, by pumping the grouting material 62 from the platform 10 through conduits (not shown) passing through the leg 24 and into the keel 26. The grouting material 62 may fill the inside of the inserts 38 and the grout ring 32 of the keel 26. As a result of the grouting step shown in FIG. 5, a shear cleat structure is formed by each of the inserts 38 that further increases the ability of the interconnection between the keel 26 and the insert/caisson assembly to withstand lateral shear forces. In addition, when the grouting material 62 cures, the shear cleats formed by the inserts 38 become permanently fixed to the bottom of the keel 26, with the upper locking elements 58 and the lower locking elements 46 being embedded in the solidified grouting material 62, and with the grouting material effectively cementing the inserts (shear cleats) 38 to the bottom surface of the keel 26.

FIG. 7 shows how the offshore structure 10 may be removed from the seabed 30 with the inserts 38 attached as shear cleats to the keel 26. As mentioned above, the solidified grouting material 62 causes the inserts 38 to be permanently attached as shear cleats to the keel 26, such that when the keel 26 (along with the offshore structure 10 of FIG. 1) is lifted away from the seabed 30 (for example, in generally vertical direction indicated by the arrow B), the shear cleats remain attached to the bottom of the keel 26, while the caissons 28 remain installed in the seabed 30. The offshore structure 10 can then be moved and installed at a second site (not shown), in which an arrangement of caissons has been pre-installed for receiving the shear cleats on the bottom of the keel. Thus, the GBS 10, in accordance with the present invention, not only is capable of withstanding strong lateral shear forces, it can be easily removed and re-installed in different sites on the seabed.

Figure 8:
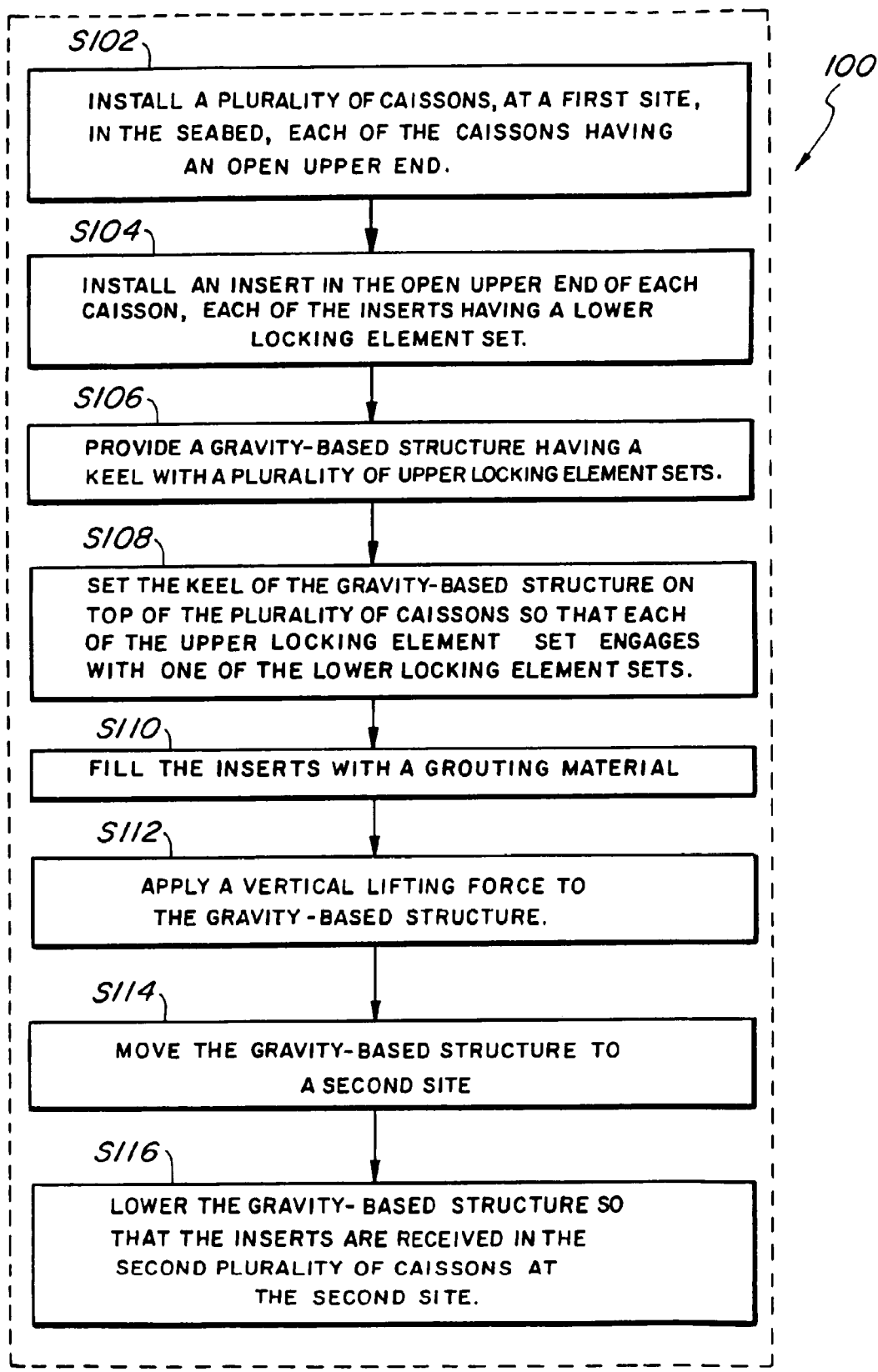
FIG. 8 schematically represents a series of steps of a method for installing and anchoring a gravity-based structure in a seabed, in accordance with the present invention.

FIG. 8 shows a preferred method 100 of installing and anchoring a gravity-based structure in a seabed, in accordance with the present invention. The method 100 comprises a step S102 of installing a plurality of caissons at a first site in the seabed, each of the caissons having an open upper end. Next, a step S104 is that of installing an insert in the open upper end of each caisson, each of the inserts having a lower locking element set, while a step S106 is that of providing a gravity-based structure having a keel with a plurality of upper locking element sets installed within the keel, each of the upper locking element sets being engageable with one of the lower locking element sets.

Setting the keel of the gravity-based structure on top of the plurality of caissons so that each of the upper locking element sets engages with one of the lower locking element sets is provided in a step S108. This is followed by a step S110, in which the inserts are filled with a grouting material. This filling step may be facilitated by the provision of grouting channels through the keel, as described above.

The method 100 may further comprise a step S112 of removing the GBS from the caissons by applying a generally vertical lifting force to the gravity-based structure so as to lift the inserts out of the caissons, the inserts remaining attached to the keel, wherein the inserts are removably installed inside the caissons. This may be followed by a step S114 of moving the gravity-based structure to a second site in the seabed, at which a second plurality of caissons has been installed in the seabed, and by a step S116 of installing the GBS at the second site by lowering the GBS so that the inserts are received in the caissons at the second site.

Although the present invention has been described with reference to specific embodiments, these embodiments are illustrative only and not limiting. Many other applications and embodiments of the present invention will be apparent in light of this disclosure and the following claims.

The invention claimed is:

1. A system for stabilizing a gravity-based offshore structure that is installable in a seabed, the structure having a keel with a bottom surface, the system comprising:
    a plurality of caissons embedded in the seabed, each of the caissons having an open upper end;
    an insert installed in each of the caissons;
    a lower locking element set affixed to each of the inserts; and
    a plurality of upper locking element sets installed in the bottom surface of the keel and arranged so that each of the upper locking element sets engages with a corresponding one of the lower locking element sets when the keel is set down on the upper ends of the caissons.

2. The system of claim 1, wherein the upper locking element sets are situated within a circumferential recess in the bottom surface of the keel.

3. The system of claim 1 wherein each of the upper locking element sets comprises at least two upper metal rods.

4. The system of claim 3, wherein each of the lower locking element sets comprises at least two bendable lower metal rods that are engageable with the upper metal rods.

5. The system of claim 1, wherein the inserts are removably installed in the caissons.

6. The system of claim 5, wherein each of the inserts is permanently fixed to the bottom surface of the keel.

7. The system of claim 6, wherein the inserts are fixed to the bottom surface of the keel by the engagement of the upper and lower locking element sets and by a grouting material.

8. A system for stabilizing a gravity-based offshore structure, of the type comprising a platform supported on a vertical leg having a lower end attached to a keel that is installable on a seabed, the keel having a bottom surface, the system comprising:
  a plurality of caissons embedded in the seabed in a predetermined pattern, each of the caissons having an open upper end;
  a plurality of inserts, each of which is removably installed in the open upper end of one of the caissons;
  a lower locking element set fixed in each of the inserts; and
  a plurality of upper locking element sets installed in the bottom surface of the keel in a pattern corresponding to the arranged pattern of the caissons whereby each of the upper locking element sets is engageable with a corresponding one of the lower locking element sets when th keel is set down on the upper ends of the caissons.

9. The system of claim 8, wherein the upper locking element sets are situated within a grout ring in the bottom of the keel.

10. The system of claim 9, wherein the keel includes a grout channel that communicates with the grout ring, and wherein the inserts are permanently attachable to the bottom surface of the keel by a grouting material introduced into the interior of the inserts through the grout channel and the grout ring.

11. The system of claim 8, wherein each of the upper locking element sets comprises a plurality of upper metal rods, and wherein each of the lower locking element sets comprises a plurality of lower metal rods that are engageable by the upper metal rods.

12. The system of claim 8, wherein the inserts are permanently attachable to the bottom surface of the keel structure by a grouting material.

13. A method of installing and anchoring a gravity-based structure in a seabed, comprising:
  installing a plurality of caissons in a selected site in the seabed, each of the caissons having an open upper end;
  installing an insert in the open upper end of each caisson, each of the inserts having a lower locking element set:
  providing a gravity-based structure having a keel having a bottom surface with a plurality of upper locking element sets installed therein, each of the upper locking element sets being engageable with a corresponding one of the lower locking element sets;
  setting the keel of the gravity-based structure on top of the plurality of caissons so that each of the upper locking element sets engages with the corresponding one of the lower locking element sets; and
  fixing the inserts to the bottom surface of the keel.

14. The method of claim 13, wherein the inserts are removably installed in the caissons.

15. The method of claim 13, wherein the fixing step includes the step of filling the inserts with a grouting material.

16. The method of claim 15, wherein the upper locking element sets are located in a grout ring in the bottom surface of the keel, and wherein the step of filling the inserts includes the step of filling the grout ring and the inserts with the grouting material.

17. The method of claim 13, further comprising:
  removing the structure from the caissons by applying a vertical lifting force to the gravity-based structure so as to lift the inserts out of the caissons.

18. The method of claim 17, further comprising:
  installing a second plurality of caissons at a second site in the seabed, each of the second plurality of caissons having an open upper end;
  moving the gravity-based structure with the inserts attached to the bottom surface of the keel to the second site in the seabed; and
  lowering the gravity-based structure so that the inserts are received in the open upper ends of the second plurality of caissons at the second site.

19. A system for stabilizing a gravity-based offshore structure that is installable in a seabed, the structure having a keel with a bottom surface, the system comprising:
  a plurality of caissons embedded in the seabed, each of the caissons having an open upper end;
  a plurality of the upper locking element sets installed in the bottom surface of the keel, each of the upper locking element sets comprising at least two upper metal rods; and
  a plurality of lower locking element sets installed in each of the caissons, each of the lower locking element sets comprising at least two bendable lower metal rods and arranged so that the upper metal rods in each of the upper locking element sets engage with the lower metal rods in a corresponding one of the lower locking element sets when the keel is set down on the upper ends of the caissons.

20. The system of claim 19, further comprising an insert removably installed in each of the caissons, wherein each of the lower locking element sets is affixed to one of the inserts.

21. The system of claim 20, wherein each of the inserts is permanently fixed to the bottom surface of the keel.

22. The system of claim 21, wherein the inserts are fixed to the bottom surface of the keel by the engagement of the upper and lower locking element sets and by a grouting material.

* * * * *